Figure 1:
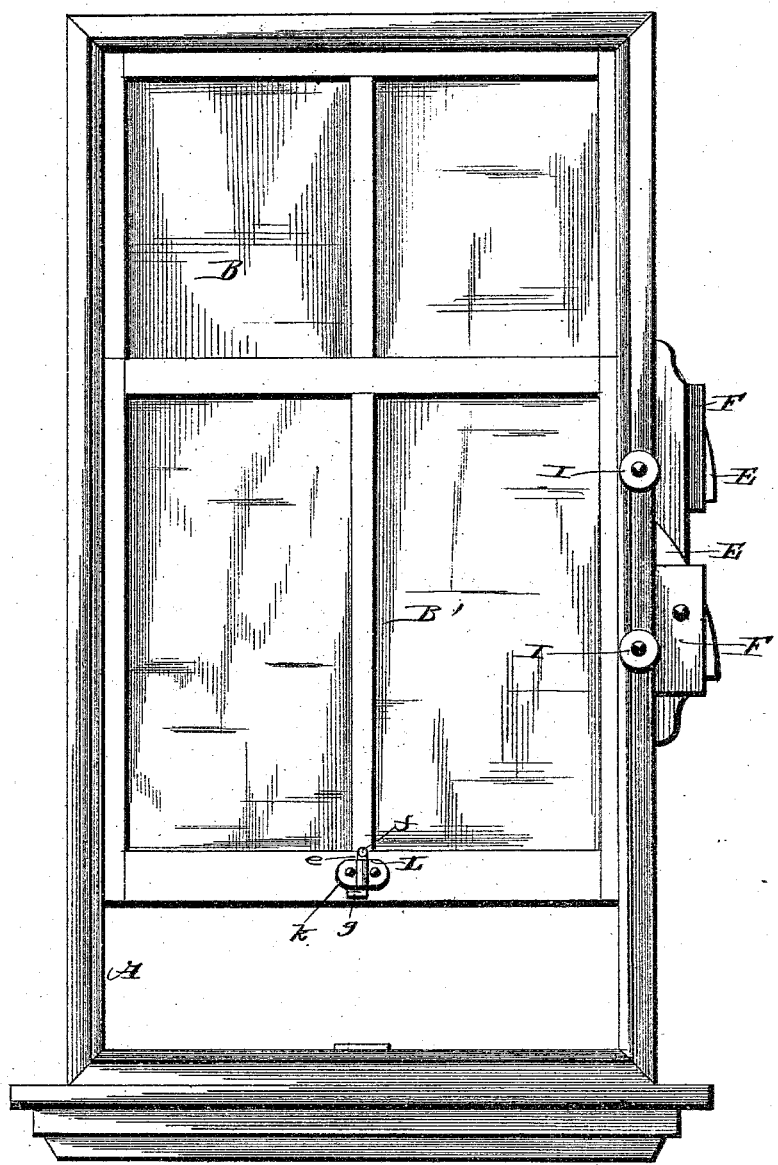

(Model.)

2 Sheets—Sheet 1.

T. B. JONES.
SASH HOLDER.

No. 295,253.

Patented Mar. 18, 1884.

WITNESSES
G. F. Downing
W. H. Ruff

INVENTOR
Thos. B. Jones.
By H. A. Symons
Attorney

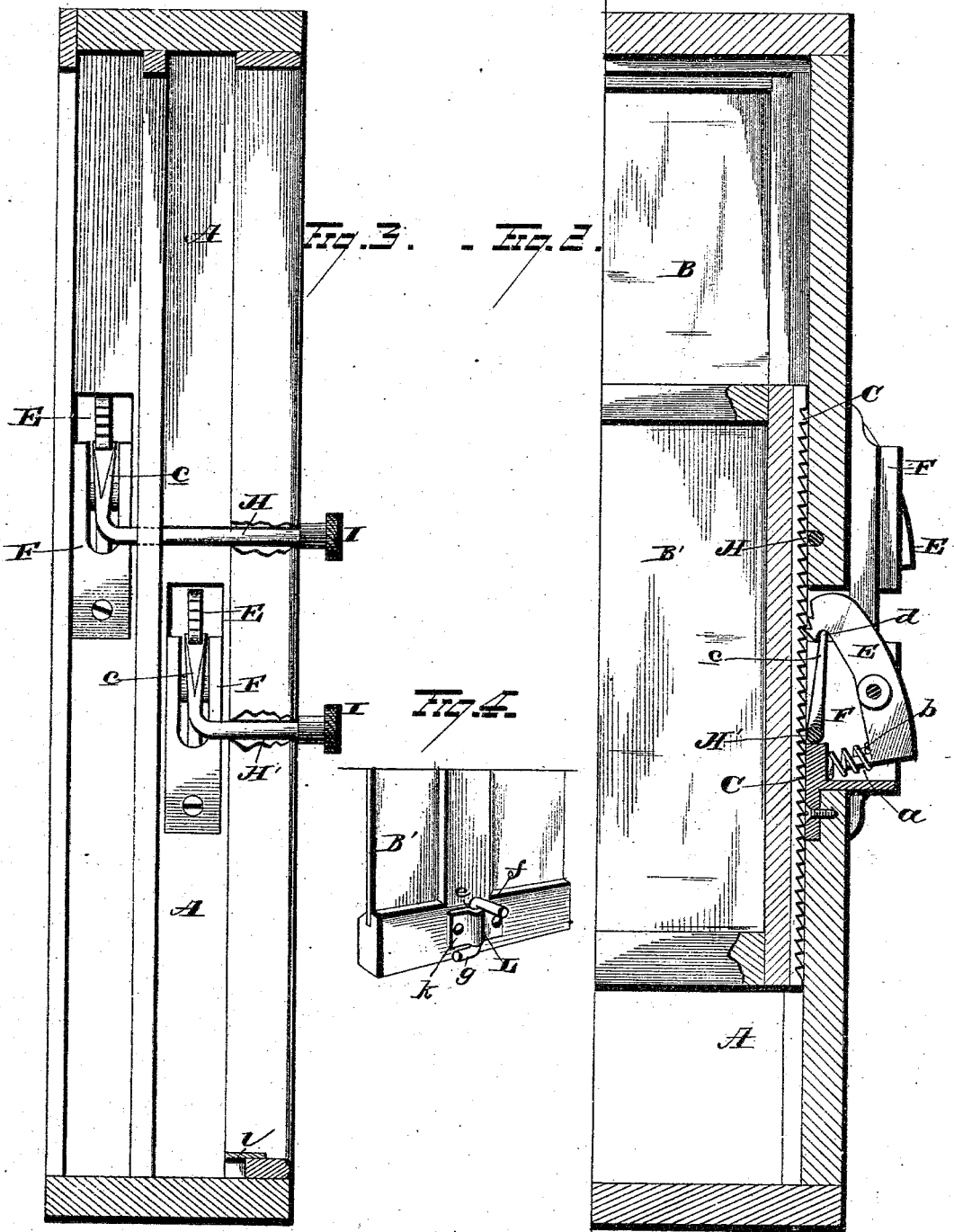

UNITED STATES PATENT OFFICE.

THOMAS BROWN JONES, OF HIAWATHA, KANSAS, ASSIGNOR OF ONE-HALF TO NATHAN S. GROVER AND DELBERT T. GROVER, BOTH OF SAME PLACE.

SASH-HOLDER.

SPECIFICATION forming part of Letters Patent No. 295,253, dated March 18, 1884.

Application filed July 25, 1883. (Model.)

*To all whom it may concern:*

Be it known that I, THOMAS B. JONES, of Hiawatha, in the county of Brown and State of Kansas, have invented certain new and useful Improvements in Sash-Holders; and I do hereby declare the following to be a full, clear, and exact description of the invention, such as will enable others skilled in the art to which it pertains to make and use the same.

My invention relates to an improvement in sash-holders, the object of the same being to provide a device of this character which shall combine simplicity and economy in construction with durability and efficiency in use; and with these ends in view my invention consists in the parts and combinations of parts, as will be more fully described, and pointed out in the claim.

In the accompanying drawings, Figure 1 is a view in front elevation of a window-sash embodying my invention. Fig. 2 is a view in vertical section taken through the frame and sash. Fig. 3 is a detached view of the operating bar or key, and Fig. 4 is an enlarged view of the device for locking the lower sash.

A represents a window-frame, and B B' the upper and lower sashes thereof, which latter are each provided on one side with a serrated or toothed bar, C, set into the side rail flush with the outer surfaces thereof. These serrated bars extend from the upper to the lower sash-rails, and form the bearing-faces for the spring-actuated dogs E. These dogs (one for each sash) are provided at their upper rounded ends with teeth or serrations adapted to engage the serrated bars secured to the side rails of the sashes. Each dog E is pivoted within a metallic casing, F, which latter is secured within the window-frame with the serrated end of the dog upward and slightly outside of the frame, so as to engage the serrated bars of the window-sashes. The casings F are so situated that the dogs will engage the two sashes, and are situated in different horizontal planes, to enable them to be operated independently. Each dog is pivotally secured within its casing about midway its length, and is provided at its lower end with an outwardly-projecting lug, *a*, against which one end of the spiral spring *b* bears, while the opposite end of this spring bears against the inner side of the face-plate of the casing. The tendency of this spring is to constantly keep the upper serrated end of the dog in engagement with the serrated bars, to prevent the sashes from falling. The position and manner of securing the dogs in position allow either sash to be freely raised without difficulty, but absolutely prevent them from being lowered without first disengaging the dog from the serrated bars. Thus it will be seen that the lower sash can be elevated and held in an elevated position until released, while the upper sash, when it is in a lowered position, can also be elevated without difficulty, but cannot be lowered without first releasing the dog from the serrated bar on the sash. This prevents the window from being lowered from the outside, and enables it to be partly lowered for the purpose of ventilating the room with absolute security.

The dogs F are disengaged from the sashes by means of the keys H H', situated in the same vertical plane, and adapted to operate, respectively, the upper and lower dogs. These keys are L-shaped, and rest in a horizontal position in the window-frame, with their short arms upward. The upper ends of these small arms *c* of the keys H H' terminate or rest in notches or recesses *d*, formed in the dogs directly under their serrated heads, for the purpose of preventing the displacement of the parts. The outer ends of the keys terminate in buttons I, by means of which the keys are turned.

When it is desired to lower either window-sash, its respective key is turned to the right, which movement disengages the dog from the serrated bar and leaves the window free to descend. When the proper position has been reached, the button is released, which frees the dog and allows the upper serrated end thereof to fly outward and bear against the serrated bar of the sash, which checks its further descent. This construction of parts is very simple, and, owing to the compactness of the dog with its casing and spring, very little of the window-frame has to be cut away to enable the parts to be secured in place.

To enable the lower sash to be locked in a closed position, and also to provide means for assisting in elevating the same, I have secured the pivoted catch L to the lower rail of the lower sash. This catch consists of a shank or body portion, e, a handle, f, and the locking-tongue g, the latter being situated at right angles to the handle, and both bent at right angles to the body e. This catch is secured to the lower sash of the lower rail by the plate k; and the locking-tongue g is adapted to be turned under the strike-plate l, secured to the window-sill. When the catch L is turned so as to bring the locking-tongue g under the strike-plate k, the handle f stands parallel with the sash-rail and presents a neat appearance, and, when turned so as to unlock the sash, stands outward at right angles to the sash, and forms a handle or grasp by which it can be raised.

This invention is exceedingly simple in construction, is durable and effective in use, and is adapted to be secured to windows without disfiguring the frame or sash.

It is evident that slight changes in construction and relative arrangement of parts might be resorted to without departing from the spirit and scope of my invention; and hence I would have it understood that I do not confine myself to the exact construction shown, but consider myself at liberty to make such changes and alterations as fairly fall within the spirit and scope of my invention.

Having fully described my invention, what I claim as new, and desire to secure by Letters Patent, is—

The combination, with a window-sash provided with a serrated bar, of a casing secured within the window-frame, the dog E, centrally pivoted within the casing, and provided with the groove d and finger a, the spring for forcing the upper end of the dog outwardly, and an independent key, shaped substantially as shown, for disengaging the dog from the serrated bar, substantially as set forth.

In testimony whereof I have signed this specification in the presence of two subscribing witnesses.

THOMAS BROWN JONES.

Witnesses:
M. L. KLINEFELTER,
J. E. MORRIS.